(12) United States Patent
Taniuchi et al.

(10) Patent No.: US 11,777,163 B2
(45) Date of Patent: Oct. 3, 2023

(54) BATTERY CELL

(71) Applicant: HONDA MOTOR CO., LTD., Tokyo (JP)

(72) Inventors: Takuya Taniuchi, Saitama (JP); Masahiro Ohta, Saitama (JP); Toshiyuki Ariga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 17/454,826

(22) Filed: Nov. 15, 2021

(65) Prior Publication Data
US 2022/0263167 A1    Aug. 18, 2022

(30) Foreign Application Priority Data

Feb. 18, 2021 (JP) .................................. 2021-024586

(51) Int. Cl.
*H01M 50/178* (2021.01)
*H01M 50/136* (2021.01)
*H01M 50/105* (2021.01)
*H01M 50/211* (2021.01)
*H01M 50/103* (2021.01)

(52) U.S. Cl.
CPC ....... *H01M 50/178* (2021.01); *H01M 50/105* (2021.01); *H01M 50/136* (2021.01); *H01M 50/211* (2021.01); *H01M 50/103* (2021.01)

(58) Field of Classification Search
CPC ............. H01M 50/178; H01M 50/105; H01M 50/136; H01M 50/211; H01M 50/103; H01M 50/531
See application file for complete search history.

(56) References Cited

U.S. PATENT DOCUMENTS

| 2011/0033742 A1* | 2/2011 | Maier | H01M 50/258 |
| | | | 165/104.31 |
| 2021/0119285 A1* | 4/2021 | Taniuchi | H01M 50/55 |
| 2021/0184265 A1* | 6/2021 | Batson | H01M 50/105 |

FOREIGN PATENT DOCUMENTS

| JP | 2012169204 A | 9/2012 | |
| WO | 2019188825 A1 | 10/2019 | |
| WO | WO-2019188825 A1 * | 10/2019 | .......... H01M 50/105 |

\* cited by examiner

*Primary Examiner* — Matthew T Martin
*Assistant Examiner* — Adam J Francis
(74) *Attorney, Agent, or Firm* — CKC & Partners Co., LLC

(57) ABSTRACT

To reduce influence of external force on a current collection tab lead and a current collection tab in a laminated cell type battery. A single film of an exterior body contacts and covers a top surface, a bottom surface, and two side surfaces of a battery perpendicular to an end surface of the battery from which a current collection tab and a current collection tab lead are provided to extend, covers the end surface of the battery from which the current collection tab and the current collection tab lead protrude, and is folded in from both short sides of the end surface such that triangular pyramid-shaped spaces are formed on both sides. A reinforcement member is arranged in and joined to each triangular pyramid-shaped space.

27 Claims, 11 Drawing Sheets

PLAN VIEW

LEFT SIDE VIEW

FRONT VIEW

RIGHT SIDE VIEW

BOTTOM VIEW

DEVELOPMENT VIEW

BATTERY CELL

This application is based on and claims the benefit of priority from Japanese Patent Application 2021-024586, filed on 18 Feb. 2021, the content of which is incorporated herein by reference.

BACKGROUND OF THE INVENTION

Field of the Invention

The present invention relates to a battery cell, and particularly relates to a battery cell sealed by an exterior body.

Related Art

In recent years, a demand for high-capacity high-power battery devices has rapidly grown due to popularization of various types of electric/electronic equipment with a variety of sizes, such as an automobile, a personal computer, and a mobile phone. Examples of these battery devices include a liquid battery cell using, as an electrolyte, an organic electrolytic solution between positive and negative electrodes and a solid-state battery cell using a fire-retardant solid electrolyte instead of using the organic electrolytic solution as the electrolyte.

For these battery devices, a laminated cell type battery cell configured such that a battery is sealed in a plate shape with the battery being covered with a laminated film (an exterior body) has been known. For a purpose such as an EV or an HEV, a battery cell assembly configured such that multiple laminated cell type battery cells as described above are arranged and housed in a case has been used. The battery is covered with the exterior body so that entry of atmospheric air into the battery can be prevented (e.g., Japanese Unexamined Patent Application, Publication No. 2012-169204). Note that in the present specification, the "battery" indicates a member including an electronic element stack having positive and negative electrodes and an electrolyte, a current collection tab, and a current collection tab lead, and one sealed with a battery being covered with a laminated film (an exterior body) will be referred to as a "battery cell".

For the purpose of effectively improving the volumetric energy density of a battery module while maintaining sealability of a laminated film (an exterior body), a battery cell including an exterior body configured such that a single film is folded to house a battery is disclosed (WO2019/188825). According to WO2019/188825, this battery cell can effectively improve the volumetric energy density of the battery module while maintaining the sealability of the exterior body. Moreover, WO2019/188825 also describes a configuration in which a current collection tab lead is housed with the current collection tab lead being vertically sandwiched by the exterior body in the battery cell.

Patent Document 1: Japanese Unexamined Patent Application, Publication No. 2012-169204
Patent Document 2: WO2019/188825

SUMMARY OF THE INVENTION

In a configuration in which a current collection tab and a current collection tab lead are housed with the current collection tab and the current collection tab lead being vertically sandwiched by an exterior body in a laminated cell type battery cell, there is a probability that when external force is applied to a location where the current collection tab and the current collection tab lead are housed, an electrode is cracked due to stress applied to the current collection tab and the current collection tab lead. In this case, the strength of a film of the exterior body itself is weak, and for this reason, an interior battery cannot be sufficiently protected from the external force only with the film of the exterior body.

An object of the present invention is to reduce, in a configuration in which a current collection tab and a current collection tab lead are housed with the current collection tab and the current collection tab lead being vertically sandwiched by an exterior body in a laminated cell type battery, influence of external force on the current collection tab and the current collection tab lead even in a case where the external force is applied to a location where the current collection tab and the current collection tab lead are housed.

To solve the above-described problems, the present invention is directed to a battery cell having a single film of an exterior body including: a portion contacting and covering a top surface, a bottom surface, and two side surfaces of a battery perpendicular to an end surface of the battery from which a current collection tab and a current collection tab lead are provided to extend; a portion covering the end surface of the battery, from which the current collection tab and the current collection tab lead protrude, folded in from both short sides of the end surface such that triangular pyramid-shaped spaces are formed on both sides, and folded from both long sides of the end surface such that the portion is entirely formed in a triangular prism shape to cover the end surface; and a portion provided to further extend in an axial direction from the end surface-covering portion and having opposing upper and lower surfaces joined to hold the current collection tab and the current collection tab lead between the upper and lower surfaces. The battery cell further has a reinforcement member provided in and joined to each triangular pyramid-shaped space.

The reinforcement member is arranged in and joined to each of the triangular pyramid-shaped spaces on both sides, the triangular pyramid-shaped spaces being formed in such a manner that the portion covering the end surface of the battery from which the current collection tab and the current collection tab lead protrude is folded in from both short sides of the end surface. With this configuration, even in a case where external force is applied to a location where the current collection tab and the current collection tab lead are housed, influence of the external force on the current collection tab and the current collection tab lead can be reduced, and a problem that an electrode is cracked due to stress applied to the current collection tab and the current collection tab lead can be reduced.

In an aspect of the present invention, in this case, the exterior body is formed of the single film.

Since the exterior body is formed of the single film, the number of joint portions can be reduced as much as possible upon packaging and sealability can be enhanced.

In an aspect of the present invention, in this case, the battery is an all-solid-state battery cell including a stack with a solid electrolyte.

The all-solid-state battery cell is brittle and easily damaged particularly at a corner portion and an end surface. For this reason, in the present invention, the reinforcement member is arranged in and joined to each of the triangular pyramid-shaped spaces on both sides at the portion covering the end surface of the battery from which the current collection tab and the current collection tab lead protrude. Thus, the structure capable of reducing the influence of the external force on the current collection tab and the current collection tab lead even in a case where the external force is applied to the location where the current collection tab and the current collection tab lead are housed is effective for application to the all-solid-state battery cell having the end surface from which the current collection tab and the current collection tab lead protrude.

In an aspect of the present invention, in this case, the reinforcement member is a four-sided body opening on one side, the four-sided body having three surfaces including one triangular surface to be joined to the end surface, from which the current collection tab and the current collection tab lead extend, in the triangular pyramid-shaped space and two surfaces to be joined to two surfaces of the exterior body forming the triangular pyramid-shaped space without being joined to the end surface upon folding.

It can be said that such a reinforcement member has the most basic configuration for reinforcing three surfaces in the space as the reinforcement member for each of the triangular pyramid-shaped spaces on both sides, the triangular pyramid-shaped spaces being formed in such a manner that the portion covering the end surface of the battery from which the current collection tab and the current collection tab lead protrude is folded in from both short sides of the end surface. The relatively-lightweight reinforcement member can efficiently reinforce the entirety of three surfaces forming the triangular pyramid-shaped space.

In an aspect of the present invention, in this case, the reinforcement member is a hollow four-sided body having four surfaces defining four surfaces in the triangular pyramid-shaped space.

A planar reinforcement portion closing the triangular pyramid-shaped space is added to the four-sided reinforcement member opening on one side. Thus, the function of the reinforcement member can be more enhanced, and the probability that the external force enters the triangular pyramid-shaped space and acts on three surfaces defining the triangular pyramid-shaped space and the force of expanding the triangular pyramid-shaped space acts accordingly can be prevented.

In an aspect of the present invention, in this case, the reinforcement member is a solid four-sided body having four surfaces defining four surfaces in the triangular pyramid-shaped space.

Needless to say, reinforcement force is increased as compared to the hollow reinforcement member. However, because of the solid member, the reinforcement member is increased in weight and requires many materials (resources). It is effective when such a reinforcement member is employed in a case where the necessity of reinforcing the end surface of the battery from which the current collection tab and the current collection tab lead protrude.

In an aspect of the present invention, in this case, the reinforcement member is a frame body including six linear frames along six sides of the triangular pyramid-shaped space.

Such a reinforcement member is a lightest member as the reinforcement member for the triangular pyramid-shaped spaces on both sides, the triangular pyramid-shaped spaces being formed in such a manner that the portion covering the end surface of the battery from which the current collection tab and the current collection tab lead protrude is folded in from both short sides of the end surface. Thus, this reinforcement member does not require many materials (resources). Although reinforcement is necessary, it is effective when such a reinforcement member is employed in a case where a weight increase due to reinforcement needs to be suppressed as much as possible.

In an aspect of the present invention, in this case, the reinforcement member includes a plurality of reinforcement members combined and integrally joined to fix the positions of a plurality of battery cells when the plurality of battery cells is stacked on each other.

In a case where the reinforcement members of the present invention are integrally connected to each other, the integrated reinforcement members are inserted into and joined to the triangular pyramid-shaped spaces at four upper, lower, right, and left (upper right, upper left, lower right, and lower left) locations of each of the battery cell stacked on each other from the front side to the back side in the horizontal direction in module formation. In this manner, the stacked battery cells can be joined to each other with the positions of these battery cells being fixed. That is, the reinforcement members for the battery cells of the present invention can function as position fixing members in a case where the battery cells are stacked on each other.

As described above, the present invention has the following advantageous effects. The reinforcement member is arranged in and joined to each of the triangular pyramid-shaped spaces on both sides, the triangular pyramid-shaped spaces being formed in such a manner that the exterior body housing the battery from which the current collection tab and the current collection tab lead protrude is folded in from both short sides of the end surface of the battery from which the current collection tab and the current collection tab lead protrude. With this configuration, even in a case where the external force is applied to the location where the current collection tab and the current collection tab lead are housed, a problem that the external force influences the end surface and also influences the current collection tab and the current collection tab lead and an electrode connected to the current collection tab and the current collection tab lead is cracked due to the stress applied to the current collection tab and the current collection tab lead can be reduced.

DETAILED DESCRIPTION OF THE INVENTION

Hereinafter, one embodiment of the present invention will be described in detail with reference to the drawings.

Figure 1:
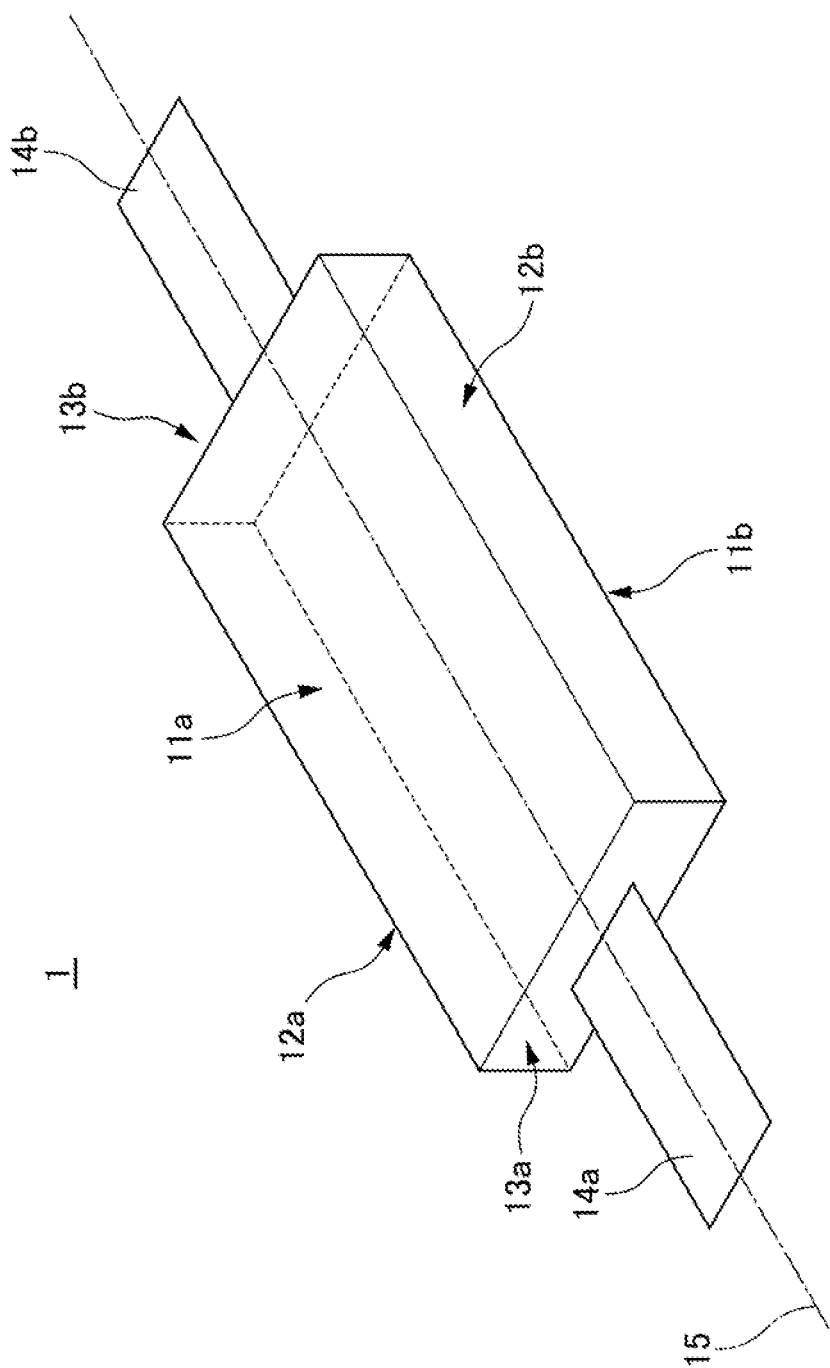
FIG. 1 shows a perspective view of a battery in a battery cell of the present invention.

A battery 1 of the present invention is an all-solid-state battery in the embodiment, and is in a rectangular parallelepiped shape as shown in FIG. 1. The battery 1 has six surfaces including a top surface 11a, a bottom surface 11b, side surfaces 12a, 12b, and end surfaces 13a, 13b. Assuming that a center axis 15 connects the centers of the end surfaces 13a, 13b to each other, each of current collection tabs/current collection tab leads 14a, 14b is provided to extend in the direction of the center axis 15 from a corresponding one of the end surfaces 13a, 13b. The all-solid-state battery is brittle and easily damaged particularly at a corner portion and a surface portion (an end surface portion), and for this reason, is more suitable for application of the configuration of each embodiment of the present invention.

Figure 2:
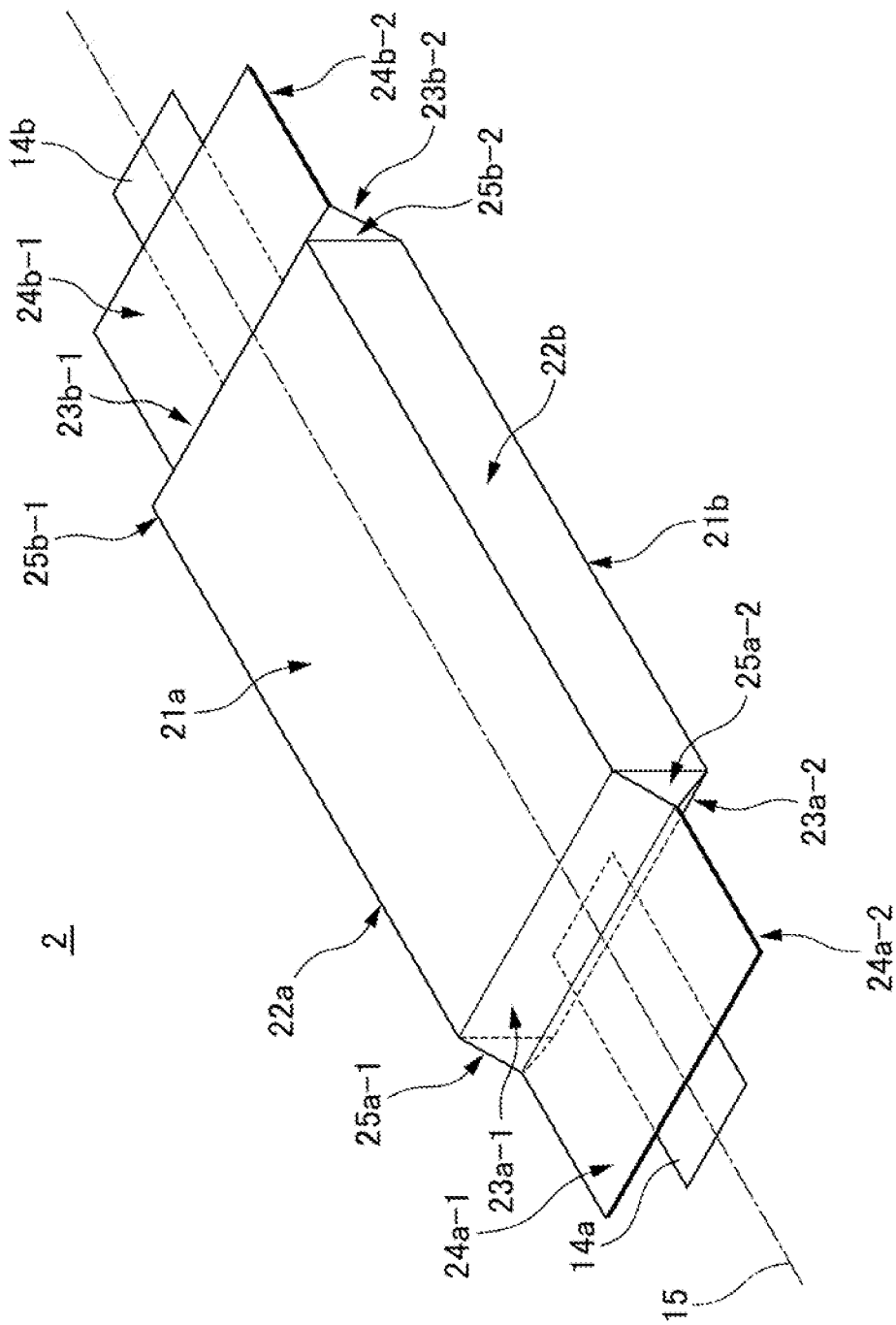
FIG. 2 shows a perspective view of an outer appearance of the battery cell of the present invention.

FIG. 2 shows a battery cell 2 configured such that the battery 1 of the present invention is packaged in an exterior body 3 (FIG. 3) with the battery 1 being covered with the exterior body 3. In the battery cell 2, a top surface 21a, a bottom surface 21b, and side surfaces 22a, 22b are defined corresponding to the battery 1. Portions corresponding to the end surfaces 13a, 13b of the battery 1 are end surface folding portions 23a-1, 23a-2, 23b-1, 23b-2 in such a form that the exterior body 3 is folded, and have appearances in a triangular prism shape. At the end surface folding portions 23a-1, 23a-2, 23b-1, 23b-2, the total of four triangular pyramid-shaped spaces 25a-1, 25a-2, 25b-1, 25b-2 formed by folding-in of the portions 23a-1, 23a-2, 23b-1, 23b-2 from side surface 22a, 22b sides are formed two on each side. Current collection tab/current collection tab lead housing portions 24a-1, 24a-2, 24b-1, 24b-2 vertically sandwiching and housing the current collection tabs/current collection tab leads 14a, 14b are provided to extend in the direction of the center axis 15 from the end surface folding portions 23a-1, 23a-2, 23b-1, 23b-2.

Figure 3:
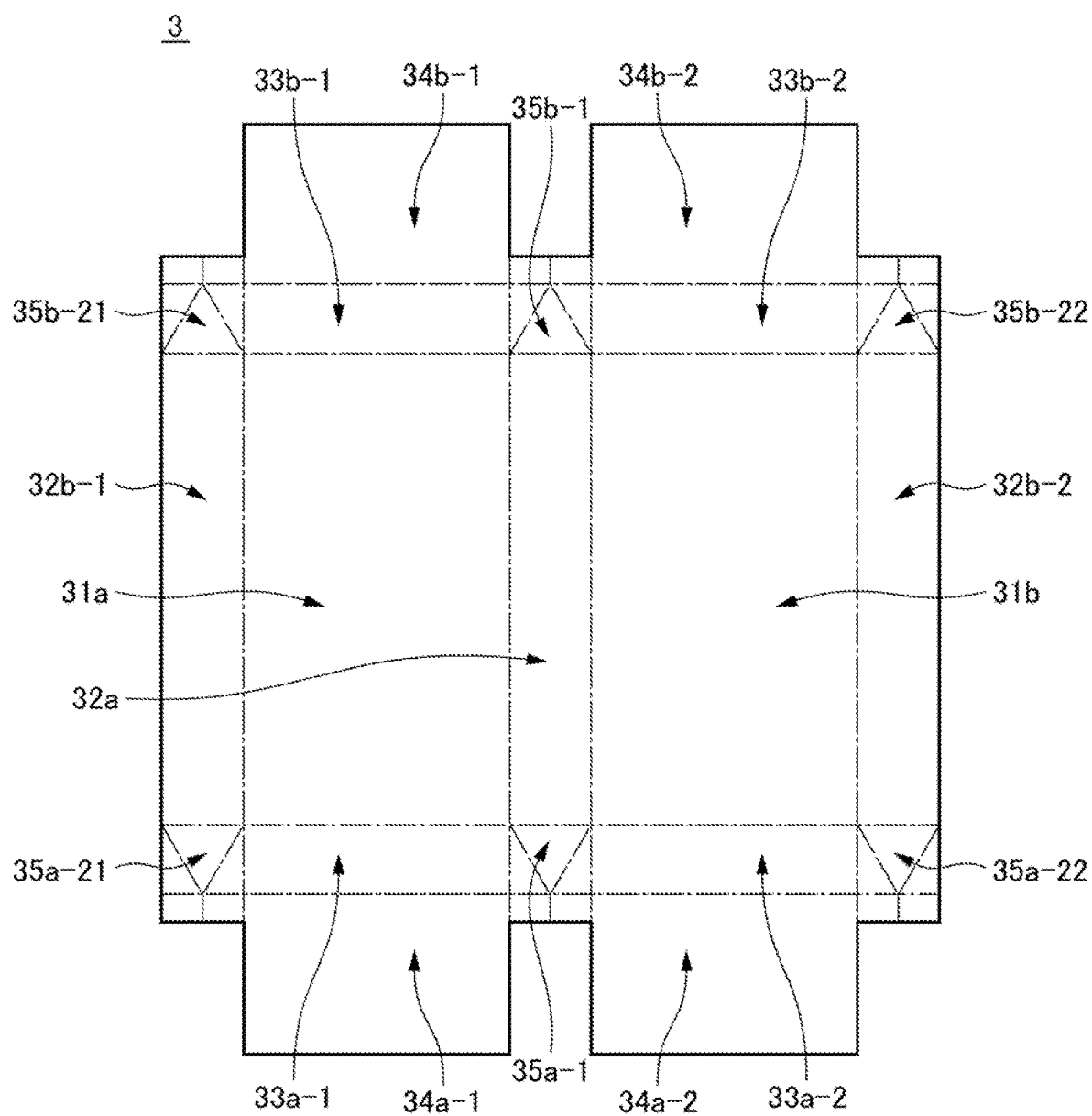
FIG. 3 shows a development view of an exterior body of the battery cell of the present invention.

FIG. 3 shows a development view of the exterior body 3. The exterior body 3 has a top surface covering portion 31a and a bottom surface covering portion 31b as portions each covering the top surface 11a and the bottom surface 11b of the battery 1, has a side surface covering portion 32a as a portion covering the side surface 12a, and has side surface covering portions 32b-1, 32b-2 as portions covering the side surface 12b. The side surface covering portions 32b-1, 32b-2 are joint portions overlapping with and joined to each other when the battery 1 is covered with the exterior body 3. Thus, the side surface 12a of the battery 1 is doubly covered with the side surface covering portions 32b-1, 32b-2 of the exterior body 3.

As portions covering the end surfaces 13a, 13b of the battery 1, end surface covering portions 33a-1, 33a-2, 33b-1, 33b-2 forming the triangular prism-shaped end surface folding portions 23a-1, 23a-2, 23b-1, 23b-2 of the battery cell 2 in the form that the exterior body 3 is folded are provided corresponding to an upper-lower direction of the end surface on each side. As extensions of the end surface covering portions 33a-1, 33a-2, 33b-1, 33b-2 in the center axis 15 direction, current collection tab/current collection tab lead sandwiching portions 34a-1, 34a-2, 34b-1, 34b-2 vertically sandwiching the current collection tabs and the current collection tab leads on both sides are provided. As portions forming the triangular pyramid-shaped spaces 25a-1, 25a-2, 25b-1, 25b-2 formed folded in from the side surface 22a, 22b sides, triangular pyramid-shaped space formation portions 35a-1, 35a-21, 35a-22, 35b-1, 35b-21, 35b-22 are formed. The triangular pyramid-shaped space formation portions 35a-21, 35a-22 overlap with each other to form the triangular pyramid-shaped space by double layers of the film of the exterior body 3, and the triangular pyramid-shaped space formation portions 35b-21, 35b-22 overlap with each other to form the triangular pyramid-shaped space by double layers of the film of the exterior body 3.

Note that the exterior body 3 is formed of the single film as described above so that the number of joint portions can be reduced as much as possible upon covering and packaging of the battery 1 and sealability can be enhanced accordingly. The exterior body 3 as shown in the development view of FIG. 3 is suitable for covering and packaging the battery 1 configured such that the current collection tabs and the current collection tab leads protrude from the end surfaces of FIG. 1, particularly the all-solid-state battery which is brittle and easily damaged at the end surface or corner portion. With the exterior body 3 of the development view of FIG. 3 formed of the single film, the efficiency of manufacturing the battery cell 2 is improved.

Figure 4:
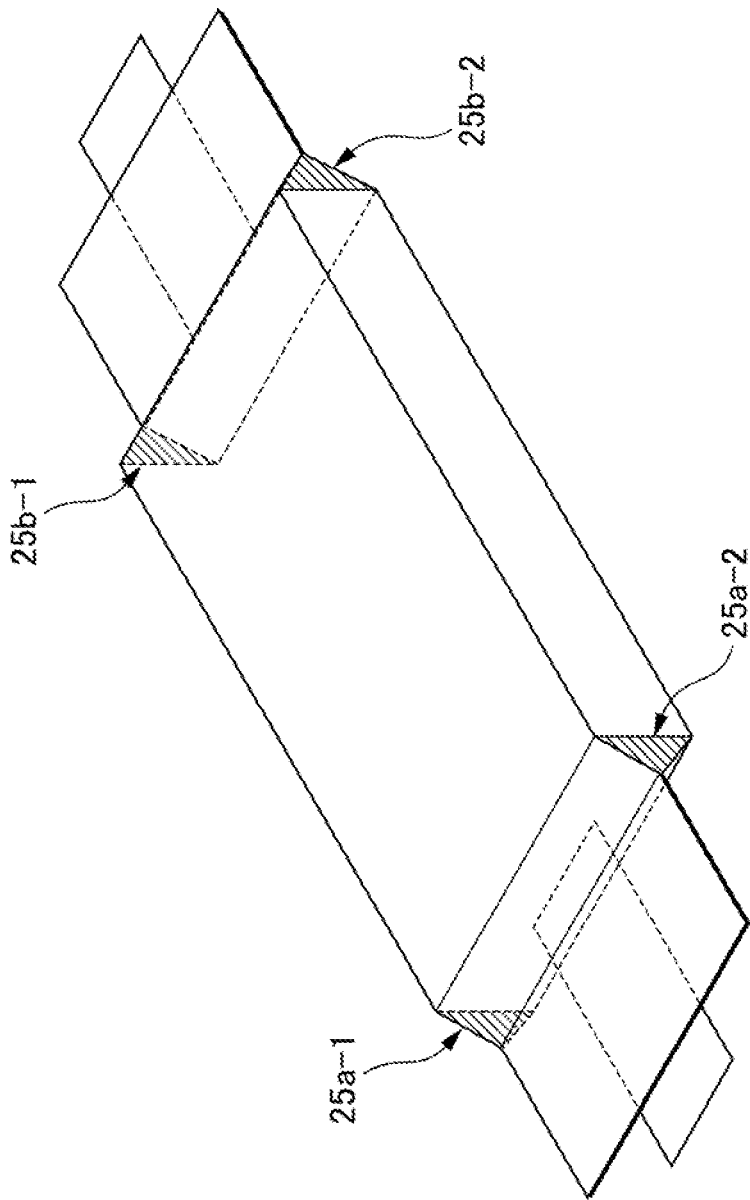
FIG. 4 shows of reinforcement member arrangement locations in the perspective view of the battery cell of the present invention.

As shown in FIG. 4, in one embodiment of the present invention, reinforcement members 4 are arranged in and joined to the shaded triangular pyramid-shaped spaces at the end portions. The reinforcement members 4 include those provided on at least some surfaces or sides forming the triangular pyramid-shaped spaces 25a-1, 25a-2, 25b-1, 25b-2. The reinforcement members 4 are arranged in and joined to the triangular pyramid-shaped spaces 25a-1, 25a-2, 25b-1, 25b-2 so that even in a case where external force is applied to locations where the current collection tabs and the current collection tab leads are housed, influence of such external force on the current collection tabs and the current collection tab leads can be reduced and a problem that the battery is cracked due to stress applied to the current collection tabs and the current collection tab leads can be reduced.

Figure 5:
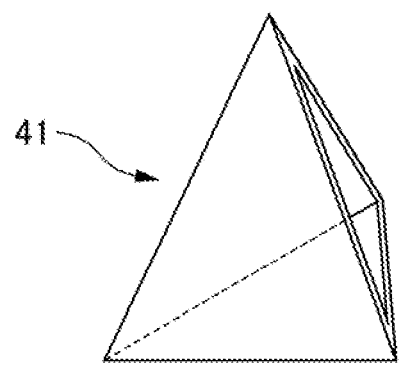
FIG. 5 shows a view of a reinforcement member as a four-sided body opening on one side in the present invention.

One example of the reinforcement member 4 in one embodiment of the present invention is a four-sided reinforcement member 41 opening on one side as shown in FIG. 5. The reinforcement member 41 has three surfaces including one triangular surface to be joined to the end surface 13a, 13b of the battery 1, from which the current collection tabs and the current collection tab leads protrude, in the triangular pyramid-shaped space 25a-1, 25a-2, 25b-1, 25b-2 and two surfaces to be joined to two surfaces of the exterior body 3 forming the triangular pyramid-shaped space 25a-1, 25a-2, 25b-1, 25b-2 without being joined to the end surface 13a, 13b upon folding. This four-sided reinforcement member 41 opening on one side has the most basic configuration among the reinforcement members 4 for reinforcing three surfaces in each of the triangular pyramid-shaped spaces 25a-1, 25a-2, 25b-1, 25b-2, and is relatively lightweight and can efficiently reinforce the entirety of three surfaces defining each of the triangular pyramid-shaped spaces 25a-1, 25a-2, 25b-1, 25b-2.

Figure 6:
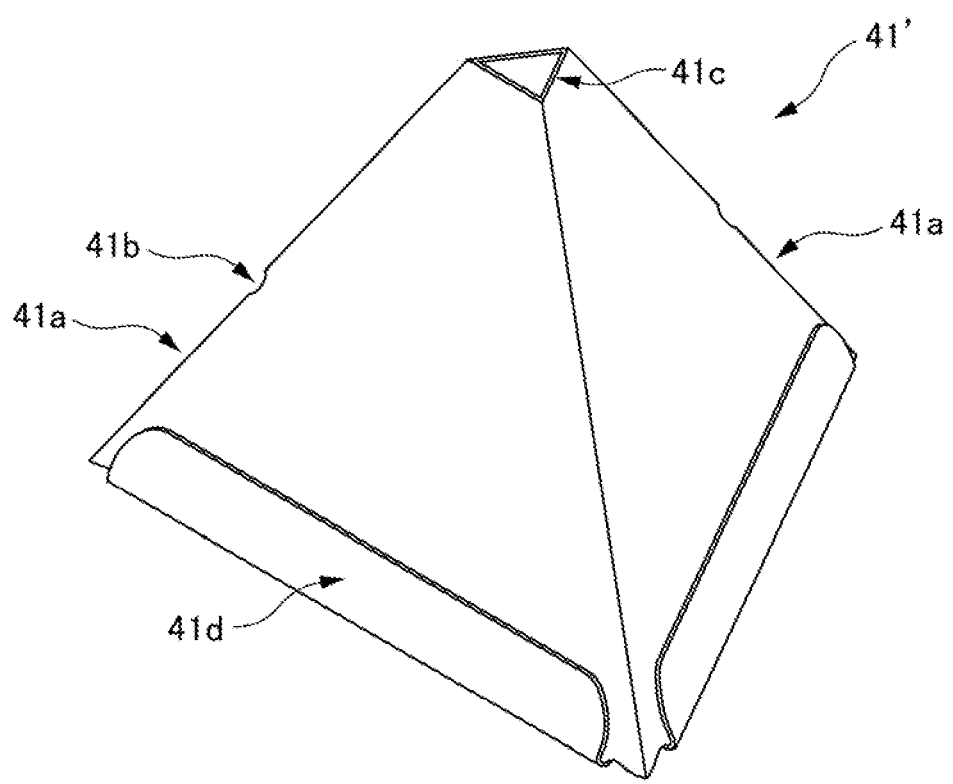
FIG. 6 shows a perspective view of a reinforcement member in a developed form of the reinforcement member as the four-sided body opening on one side in the present invention.
Figure 7:
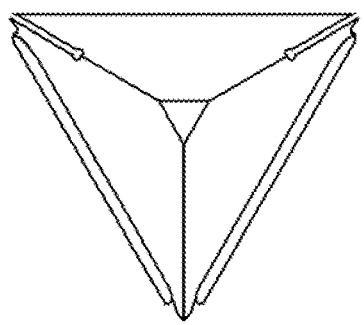
FIG. 7 shows a top view, a left view, a front view, a right view, and a bottom view of the reinforcement member in the developed form of the reinforcement member as the four-sided body opening on one side in the present invention.
Figure 7:
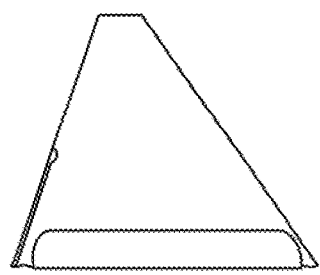
Figure 7:
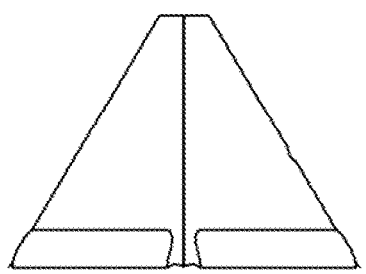
Figure 7:
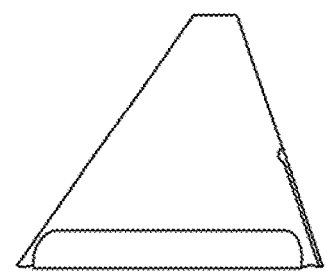
Figure 7:
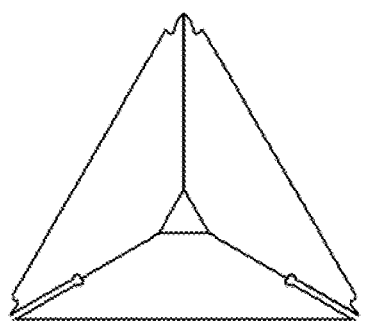
Figure 8:
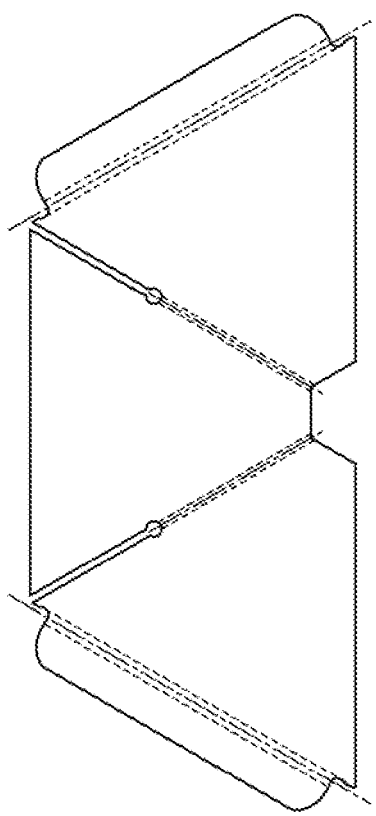
FIG. 8 shows a development view of the reinforcement member in the developed form of the reinforcement member as the four-sided body opening on one side in the present invention.

The four-sided reinforcement member 41 opening on one side can be, as shown in FIGS. 6 to 8, a reinforcement member 41' in a further-developed form. For the reinforcement member 41' in the developed form, FIG. 6 shows a perspective view, and FIG. 7 shows a top view, a left view, a front view, a right view, and a bottom view. Moreover, FIG. 8 shows a development view.

As shown in FIGS. 6 to 8, in the reinforcement member 41' in the developed form, slits 41a are formed at some of ridge portions, and holes 41b are each provided at tip ends of the slits 41a. Moreover, a flat surface 41c is formed at a top portion, and folded-back portions 41d folded back to the outside are provided on the lower side.

The slits 41a produce a plate spring effect, and can reduce not only the external force but also vibration. This point will be supplementarily described. The technique of using a plate bent in a stress direction is generally employed as the technique of providing a plate spring structure. If the four-sided reinforcement member 41 opening on one side has a structure with bent surfaces, the area of contact with the exterior body 3 is small and the exterior body 3 is damaged due to stress concentration on such a small contact area. For this reason, the technique of bending the surfaces of the reinforcement member 41 to provide the bent surface structure as described above cannot be employed.

Thus, the stress is received by the entirety of the surfaces of the reinforcement member 41 each contacting the surfaces of the exterior body 3 in the triangular pyramid-shaped space 25a-1, 25a-2, 25b-1, 25b-2, and in this manner, stress concentration is eliminated. In addition, the technique of forming the slits 41a at some of the ridge portions of the reinforcement member 41 to provide the plate spring structure is employed as the technique of absorbing the external force and the vibration. Bending stress is mainly on each surface in the triangular pyramid-shaped space 25a-1, 25a-2, 25b-1, 25b-2, but the plate spring structure in which the slits 41a are formed at some of the ridge portions of the reinforcement member 41 effectively provides a bending stress relaxing function.

The hole 41b provided at the tip end of the slit 41a is for relaxing stress generated at the tip end of the slit 41a. That is, the hole 41b prevents damage of the reinforcement member 41' from the tip end of the slit 41a due to stress concentration on the tip end of the slit 41a. Moreover, the holes 41b also provide additional features and advantageous effects that the accuracy of dimension in plate bending is improved in a case where the reinforcement member 41' is made of metal.

In the reinforcement member 41' in the developed form, the flat surface 41c is formed at the top portion on a tip end side in an insertion direction. When the reinforcement member 41' is attached, stress detaching welded portions of the exterior body 3 is generated in an attachment direction. However, the flat surface 41c can reduce such stress detaching the welded portions, and contributes to retention of the sealability.

The folded-back portions 41d folded back to the outside are provided at locations corresponding to the sides of the exterior body 3 positioned outside the triangular pyramid-shaped space 25a-1, 25a-2, 25b-1, 25b-2. With the folded-back portions 41d, position retention of the reinforcement member 41' is improved. With the folded-back portions 41d, the exterior body 3 can be sandwiched between the folded-back portion 41d and an outer surface of the reinforcement member 41', and therefore, an adhesive or a double-sided tape is not necessary and a manufacturing process is simplified.

As one embodiment, in a case where the reinforcement member 4 is used for the triangular pyramid-shaped space 25a-1, 25a-2, 25b-1, 25b-2 of the exterior body 3, a reinforcement plate (not shown) can be arranged on the surface of the exterior body 3 in the triangular pyramid-shaped space 25a-1, 25a-2, 25b-1, 25b-2. In this case, the exterior body 3 and the reinforcement plate can be sandwiched between the folded-back portion 41d and the outer surface of the reinforcement member 41'. With this configuration, the surface, which is a lowest-strength portion, of the exterior body 3 outside the triangular pyramid-shaped space 25a-1, 25a-2, 25b-1, 25b-2 can be strongly reinforced. Moreover, influence of external force vertically on the reinforcement plate can be also reduced, and therefore, the stress on the welded portions of the exterior body 3 can be reduced and the sealability can be improved. As a result, influence of moisture on the battery 1 can be reduced, and gas discharging can be prevented even in a case where gas is generated inside the exterior body 3.

Figure 9:
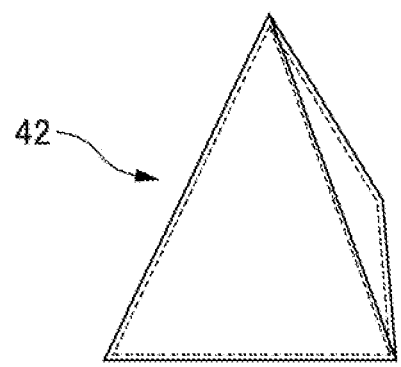
FIG. 9 shows a view of a reinforcement member as a hollow four-sided body in the present invention.

Another example of the reinforcement member 4 in one embodiment of the present invention is a reinforcement member 42 as a hollow four-sided body having four surfaces defining four sides of the triangular pyramid-shaped space 25a-1, 25a-2, 25b-1, 25b-2, as shown in FIG. 9. The reinforcement member 42 as the hollow four-sided body having four surfaces additionally includes a planar reinforcement portion closing the triangular pyramid-shaped space 25a-1, 25a-2, 25b-1, 25b-2. This can make the triangular pyramid-shaped space 25a-1, 25a-2, 25b-1, 25b-2 stronger, and can also prevent the external force from entering the triangular pyramid-shaped space 25a-1, 25a-2, 25b-1, 25b-2 and acting on three surfaces defining such a triangular pyramid-shaped space, thereby preventing the force of deforming the triangular pyramid-shaped space 25a-1, 25a-2, 25b-1, 25b-2 from acting on such a triangular pyramid-shaped space.

Figure 10:
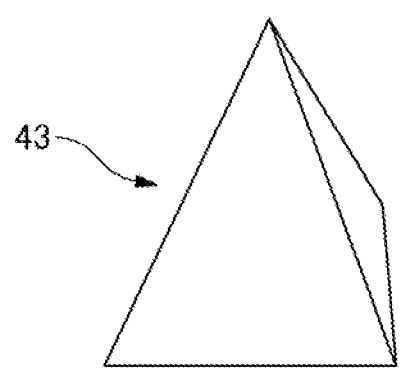
FIG. 10 shows a view of a reinforcement member as a solid four-sided body in the present invention.

Still another example of the reinforcement member 4 in one embodiment of the present invention is a reinforcement member 43 as a solid four-sided body having four surfaces defining four sides of the triangular pyramid-shaped space 25a-1, 25a-2, 25b-1, 25b-2, as shown in FIG. 10. It can be said that the reinforcement member 43 as the solid four-sided body is stronger because the reinforcement member 43 is the solid body. However, in other aspects, the reinforcement member 43 is increased in weight, and requires many materials (resources). It is effective when the reinforcement member 43 is employed in a case where the necessity of reinforcing the end surfaces 13a, 13b of the battery 1 and four corner portions at intersections between the end surface 13a, 13b and the side surface 12a, 12b is high.

Figure 11:
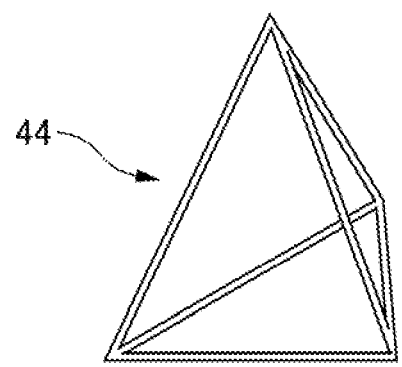
FIG. 11 shows a view of a reinforcement member as a frame body in the present invention.

Still another example of the reinforcement member 4 in one embodiment of the present invention is a reinforcement member 44 as a frame body including six linear members along six sides of the triangular pyramid-shaped space 25a-1, 25a-2, 25b-1, 25b-2, as shown in FIG. 11. The reinforcement member 44 as the frame body is a lightest member as compared to those described above as the examples, and therefore, does not require many materials (resources). Although it is necessary to reinforce the end surfaces 13a, 13b of the battery 1 and four corner portions at the intersections between the end surface 13a, 13b and the side surface 12a, 12b, it is effective when the reinforcement member 44 is employed in a case where an increase in the weight of the battery cell 2 due to reinforcement needs to be suppressed as much as possible.

In the reinforcement member 44 as the frame body, a flat surface can be also formed at a top portion on a tip end side in an insertion direction as in the reinforcement member 41' in the developed form. In this case, the reinforcement member 44 is in such a form that the tip end portion in the insertion direction is cut parallel with a bottom surface. At the cut portion, frames connecting the cut frames on each side are arranged, and the flat surface including the frames in a triangular shape is formed.

In addition to the linear (rod-shaped) frame, an L-shaped frame having an L-shaped section or a U-shaped frame having a U-shaped section can be also used as the frame of the reinforcement member 44 as the frame body. In the case of the L-shaped frame, such a frame is arranged such that an intersection between two flat surfaces of the L-shape is on the outside of the reinforcement member 44, and a slit and a hole at a tip end of the slit can be provided at such an intersection. The L-shaped frame is used as at least some of the frames of the reinforcement member 44 as the frame body so that the slit and the hole at the tip end of the slit can be formed at some of ridge portions of the reinforcement member 44.

Alternatively, the U-shaped frame can be also used as at least some of the frames of the reinforcement member 44 as the frame body. The U-shaped frame is employed as a frame at a location, which corresponds to the side of the exterior body 3 positioned outside the triangular pyramid-shaped space 25*a*-1, 25*a*-2, 25*b*-1, 25*b*-2, of the reinforcement member 44 as the frame body. The reinforcement member 44 is arranged such that one flat surface of the U-shape is positioned on the outside, and in this manner, folded-back portions folded back to the outside can be provided. With these folded-back portions, position retention of the reinforcement member 44 can be improved, and the exterior body 3 can be sandwiched between the folded-back portion and an outer surface of the reinforcement member 44.

Figure 12:
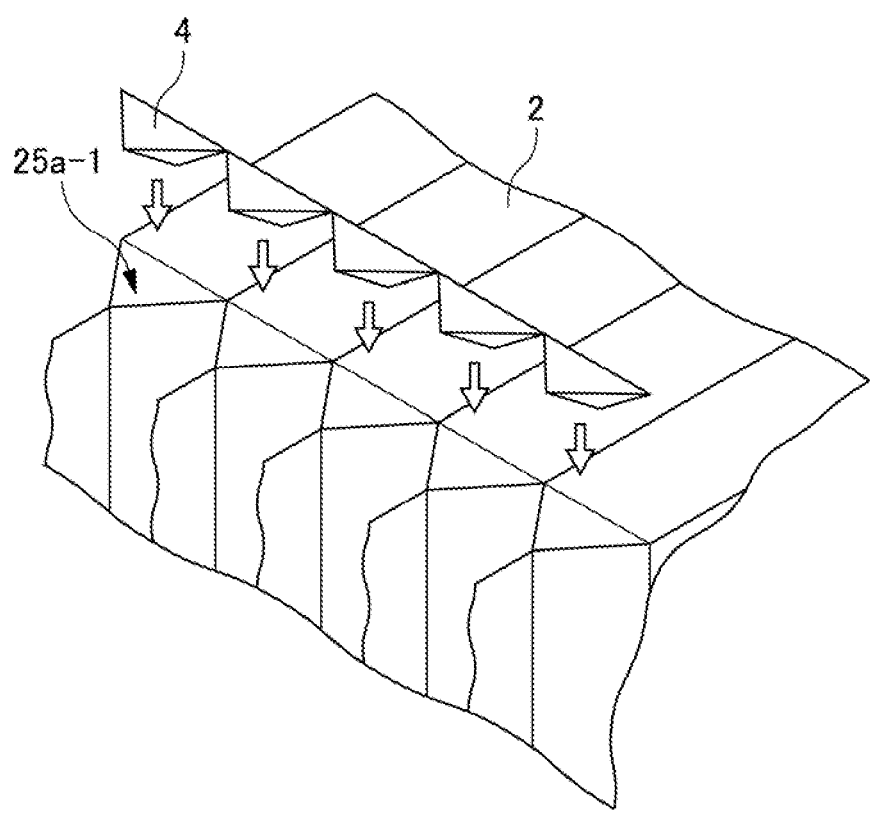
FIG. 12 shows a view of a plurality of reinforcement members integrated as a fixing member in the present invention.

In another embodiment of the present invention, a plurality of reinforcement members 4 is combined and integrally joined as shown in FIG. 12. In a case where the reinforcement members 4 are integrally connected to each other, the integrated reinforcement members 4 are inserted into and joined to the triangular pyramid-shaped spaces 25*a*-1, 25*a*-2, 25*b*-1, 25*b*-2 at four upper, lower, right, and left (upper right, upper left, lower right, and lower left) locations of each of battery cells 2 stacked on each other from the front side to the back side in the horizontal direction in module formation. In this manner, the stacked battery cells 2 can be joined to each other with the positions of these battery cells 2 being fixed. That is, the reinforcement members 4 for the battery cells 2 of the present invention can be combined and integrally joined to function as position fixing members in a case where the battery cells 2 are stacked on each other.

Resin or metal is used as the material of the reinforcement member 4, 41, 41', 42, 43, 44 of the present invention. The resin is a preferred material because the resin can be used for integral molding by injection molding, is low in cost and light weight, and can provide a sufficient reinforcement effect in terms of strength.

The embodiments of the present invention have been described above with reference to the examples, but the present invention is not limited to these examples. Needless to say, various forms can be made without departing from the gist of the present invention.

EXPLANATION OF REFERENCE NUMERALS

1 Battery
11*a* Top Surface
11*b* Bottom Surface
12*a*, 12*b* Side Surface
13*a*, 13*b* End Surface
14*a*, 14*b* Current collection Tab/Current collection Tab Lead
15 Center Axis
2 Battery Cell
21*a* Top Surface
21*b* Bottom Surface
22*a*, 22*b* Side Surface
23*a*-1, 23*a*-2, 23*b*-1, 23*b*-2 End Surface Folding Portion
24*a*-1, 24*a*-2, 24*b*-1, 24*b*-2 Current collection Tab/Current collection Tab Lead Housing Portion
25*a*-1, 25*a*-2, 25*b*-1, 25*b*-2 Triangular Pyramid-Shaped Space
3 Exterior Body
31*a* Top Surface Covering Portion
31*b* Bottom Surface Covering Portion
32*a*, 32*b*-1, 32*b*-2 Side Surface Covering Portion
33*a*-1, 33*a*-2, 33*b*-1, 33*b*-2 End Surface Covering Portion
34*a*-1, 34*a*-2, 34*b*-1, 34*b*-2 Current collection Tab/Current collection Tab Lead Sandwiching Portion
35*a*-1, 35*a*-21, 35*a*-22, 35*b*-1, 35*b*-21, 35*b*-22 Triangular Pyramid-Shaped Space Formation Portion
4 Reinforcement Member
41 Four-Sided Reinforcement Member Opening on One Side
41' Reinforcement Member in Developed Form of Four-Sided Reinforcement Member Opening on One Side
41*a* Slit
41*b* Hole at Tip End of Slit
41*c* Flat Surface at Top Portion
41*d* Folded-Back Portion
42 Reinforcement Member as Hollow Four-Sided Body Having Four Surfaces
43 Reinforcement Member as Solid Four-Sided Body
44 Reinforcement Member as Frame Body Including Six Linear Members

What is claimed is:

1. A battery cell comprising:
a battery;
an exterior body housing the battery;
a current collection tab and a current collection tab lead that are provided to extend from one end surface of the battery;
the exterior body comprising: a first portion contacting and covering a top surface, a bottom surface, and two side surfaces of the battery perpendicular to the one end surface from which the current collection tab and the current collection tab lead are provided to extend; a second portion covering the one end surface of the battery, from which the current collection tab and the current collection tab lead protrude, folded in from both short sides of the one end surface such that triangular pyramid-shaped spaces are formed on the both sides, and folded from both long sides of the one end surface such that the second portion is entirely formed in a triangular prism shape to cover the one end surface; and a third portion provided to further extend in an axial direction from the one end surface-covering second portion and having upper and lower surfaces joined to hold the current collection tab and the current collection tab lead between the upper and lower surfaces; and
a reinforcement member provided in and joined to each triangular pyramid-shaped space,
wherein the reinforcement member is a four-sided body opening on one side, the four-sided body having three surfaces including one triangular surface to be joined to the one end surface, from which the current collection tab and the current collection tab lead extend, in the triangular pyramid-shaped space and two surfaces to be joined to two surfaces of the exterior body forming the triangular pyramid-shaped space without being joined to the one end surface upon folding, wherein the reinforcement member has a folded-back portion at a position of the reinforcement member corresponding to an outer opening of the triangular pyramid-shaped space formed in the exterior body and the folded-back portion is folded back to an outside of the exterior body.

2. The battery cell according to claim 1, wherein the exterior body is formed of a single film.

3. The battery cell according to claim 1, wherein the battery is an all-solid-state battery cell including a stack with a solid electrolyte.

4. A battery cell comprising:
a battery;
an exterior body housing the battery;
a current collection tab and a current collection tab lead that are provided to extend from one end surface of the battery;
the exterior body comprising: a first portion contacting and covering a top surface, a bottom surface, and two side surfaces of the battery perpendicular to the one end surface from which the current collection tab and the current collection tab lead are provided to extend; a second portion covering the one end surface of the battery, from which the current collection tab and the current collection tab lead protrude, folded in from both short sides of the one end surface such that triangular pyramid-shaped spaces are formed on the both sides, and folded from both long sides of the one end surface such that the second portion is entirely formed in a triangular prism shape to cover the one end surface; and a third portion provided to further extend in an axial direction from the one end surface-covering second portion and having upper and lower surfaces joined to hold the current collection tab and the current collection tab lead between the upper and lower surfaces; and
a reinforcement member provided in and joined to each triangular pyramid-shaped space,
wherein the reinforcement member is a hollow four-sided body having four surfaces defining four surfaces in the triangular pyramid-shaped space,
wherein the reinforcement member has a folded-back portion at a position of the reinforcement member corresponding to an outer opening of the triangular pyramid-shaped space formed in the exterior body and the folded-back portion is folded back to an outside of the exterior body.

5. The battery cell according to claim 1, wherein the reinforcement member has a slit at some ridge portions of the reinforcement member.

6. The battery cell according to claim 5, wherein the reinforcement member has a hole at an end portion of the slit.

7. The battery cell according to claim 4, wherein the reinforcement member has a slit at some ridge portions of the reinforcement member.

8. The battery cell according to claim 7, wherein the reinforcement member has a hole at an end portion of the slit.

9. The battery cell according to claim 1, wherein the exterior body is sandwiched between the folded-back portion and an outer surface of the reinforcement member.

10. The battery cell according to claim 9, wherein a reinforcement plate is arranged between the triangular pyramid-shaped space of the exterior body and the reinforcement member, and the exterior body and the reinforcement plate are sandwiched between the folded-back portion and the outer surface of the reinforcement member.

11. The battery cell according to claim 4, wherein the exterior body is sandwiched between the folded-back portion and an outer surface of the reinforcement member.

12. The battery cell according to claim 11, wherein a reinforcement plate is arranged between the triangular pyramid-shaped space of the exterior body and the reinforcement member, and the exterior body and the reinforcement plate are sandwiched between the folded-back portion and the outer surface of the reinforcement member.

13. A battery cell comprising:
a battery;
an exterior body housing the battery;
a current collection tab and a current collection tab lead that are provided to extend from one end surface of the battery;
the exterior body comprising: a first portion contacting and covering a top surface, a bottom surface, and two side surfaces of the battery perpendicular to the one end surface from which the current collection tab and the current collection tab lead are provided to extend; a second portion covering the one end surface of the battery, from which the current collection tab and the current collection tab lead protrude, folded in from both short sides of the one end surface such that triangular pyramid-shaped spaces are formed on the both sides, and folded from both long sides of the one end surface such that the second portion is entirely formed in a triangular prism shape to cover the one end surface; and a third portion provided to further extend in an axial direction from the one end surface-covering second portion and having upper and lower surfaces joined to hold the current collection tab and the current collection tab lead between the upper and lower surfaces; and
a reinforcement member provided in and joined to each triangular pyramid-shaped space,
wherein the reinforcement member is a frame body including six frames along six sides of the triangular pyramid-shaped space.

14. The battery cell according to claim 13, wherein at least some of the frames of the reinforcement member as the frame body are each an L-shaped frame.

15. The battery cell according to claim 14, wherein the L-shaped frame is slitted.

16. The battery cell according to claim 15, wherein the slitted L-shaped frame of the reinforcement member forms a slit at some ridge portions of the reinforcement member.

17. The battery cell according to claim 15, wherein a hole is formed at an end portion of the slit.

18. The battery cell according to claim 13, wherein at least some of the frames of the reinforcement member as the frame body are formed of a U-shaped frame.

19. The battery cell according to claim 18, wherein by means of the U-shaped frame, the reinforcement member as the frame body is configured such that a folded-back portion folded back to an outside is formed at a position corresponding to an outer opening of the triangular pyramid-shaped space formed in the exterior body.

20. The battery cell according to claim 19, wherein the exterior body is sandwiched between the folded-back portion and an outer surface of the reinforcement member.

21. The battery cell according to claim 20, wherein a reinforcement plate is arranged between the triangular pyramid-shaped space of the exterior body and the reinforcement member, and the exterior body and the reinforcement plate are sandwiched between the folded-back portion and the outer surface of the reinforcement member.

22. The battery cell according to claim 1, wherein the reinforcement member is configured such that a flat surface is formed at a top portion.

23. The battery cell according to claim 4, wherein the reinforcement member is configured such that a flat surface is formed at a top portion.

24. The battery cell according to claim 1, wherein the reinforcement member is made of resin.

25. The battery cell according to claim 1, wherein the reinforcement member includes a plurality of reinforcement members combined and integrally joined to fix positions of a plurality of battery cells when the plurality of battery cells is stacked on each other.

26. A battery cell module formed such that battery cells are stacked on each other,
- a position of each battery cell being fixed using the plurality of combined and integrally-joined reinforcement members according to claim 24 when the battery cells are stacked on each other.

27. A battery cell position fixing method for forming a battery cell module such that battery cells are stacked on each other,
- a position of each battery cell being fixed using the plurality of combined and integrally-joined reinforcement members according to claim 24 when the battery cells are stacked on each other.

\* \* \* \* \*